(12) United States Patent
Sachs et al.

(10) Patent No.: US 8,321,040 B2
(45) Date of Patent: Nov. 27, 2012

(54) METHOD FOR OPERATING A SAFETY CONTROL AND AUTOMATION NETWORK HAVING SUCH A SAFETY CONTROL

(75) Inventors: Jens Sachs, Petershagen (DE); Holger Buttner, Berlin (DE); Dirk Janssen, Verl (DE); Guido Beckmann, Verl (DE)

(73) Assignee: Beckhoff Automation GmbH, Verl (DE)

( * ) Notice: Subject to any disclaimer, the term of this patent is extended or adjusted under 35 U.S.C. 154(b) by 85 days.

(21) Appl. No.: 12/905,363

(22) Filed: Oct. 15, 2010

(65) Prior Publication Data

US 2011/0093096 A1    Apr. 21, 2011

Related U.S. Application Data

(63) Continuation of application No. PCT/EP2009/052673, filed on Mar. 6, 2009.

(30) Foreign Application Priority Data

Apr. 17, 2008  (DE) .................. 10 2008 019 195

(51) Int. Cl.
*G05B 9/02* (2006.01)
(52) U.S. Cl. ............................. 700/81; 700/79
(58) Field of Classification Search .............. 700/3, 21, 700/79, 80; 714/15, 24, 31, 47.2, 47.3, E11.017, 714/E11.059, E11.06
See application file for complete search history.

(56) References Cited

U.S. PATENT DOCUMENTS

| | | | |
|---|---|---|---|
| 5,010,459 A | 4/1991 | Taylor et al. | |
| 6,647,301 B1 * | 11/2003 | Sederlund et al. | 700/79 |
| 7,162,311 B2 * | 1/2007 | Muneta et al. | 700/21 |
| 7,213,168 B2 * | 5/2007 | Kalan et a | 714/11 |
| 7,242,116 B2 * | 7/2007 | Kawazu et al. | 307/326 |
| 7,286,886 B2 * | 10/2007 | Klopfer et al. | 700/79 |
| 7,328,370 B2 * | 2/2008 | Gibart et al. | 714/11 |
| 7,783,790 B2 | 8/2010 | Meyer et al. | |
| 7,888,825 B2 * | 2/2011 | Iida et al. | 307/326 |
| 7,891,467 B2 * | 2/2011 | Kattainen et al. | 187/394 |
| 8,134,448 B2 * | 3/2012 | Oster et al. | 340/3.1 |
| 2003/0084316 A1 | 5/2003 | Schwartz | |
| 2006/0120390 A1 | 6/2006 | Habben et al. | |
| 2007/0124115 A1 * | 5/2007 | Buttner et al. | 702/186 |
| 2008/0010638 A1 * | 1/2008 | Klopfer et al. | 717/168 |

(Continued)

FOREIGN PATENT DOCUMENTS

CN    1802820    7/2006

(Continued)

OTHER PUBLICATIONS

Translation of the Notification of the First Office Action issued by Chinese Patent Office in connection with Chinese Patent Application No. 200980118880.X 4 pages.

(Continued)

*Primary Examiner* — Charles Kasenge
(74) *Attorney, Agent, or Firm* — Dorsey & Whitney LLP

(57) ABSTRACT

In order to operate a safety control in an automation network having a master subscriber which implements the safety control, the safety control is assigned an identifier. When loading the safety control, the master subscriber checks whether the stored identifier in the safety master subscriber matches the identifier calculated form the safety control, and the automation network changes to a safe state if it is determined that the identifier differs.

15 Claims, 4 Drawing Sheets

U.S. PATENT DOCUMENTS

2010/0057959 A1    3/2010    Korrek

FOREIGN PATENT DOCUMENTS

| | | |
|---|---|---|
| DE | 10248465 A1 | 5/2003 |
| DE | 102004 015 616 A1 | 11/2004 |
| DE | 102004 003 569 A1 | 12/2004 |
| DE | 102004035033 A1 | 2/2006 |
| DE | 102004035831 | 2/2006 |
| DE | 102005017298 A1 | 10/2006 |
| DE | 102006051222 | 3/2008 |
| EP | 0253082 | 1/1988 |
| GB | 2403819 A | 1/2005 |
| GB | 2399192 B | 8/2006 |
| JP | 2001265402 | 9/2001 |
| JP | 2003513347 | 4/2003 |
| JP | 2007219667 | 8/2007 |
| JP | 2007533045 | 11/2007 |
| WO | 2006/069762 A1 | 7/2006 |
| WO | 2007/051595 A1 | 5/2007 |

OTHER PUBLICATIONS

English translation of Japanese Office Action issued in connection with Japanese Patent Application 2011-504395. Jun. 12, 2012. 4 pages.

* cited by examiner

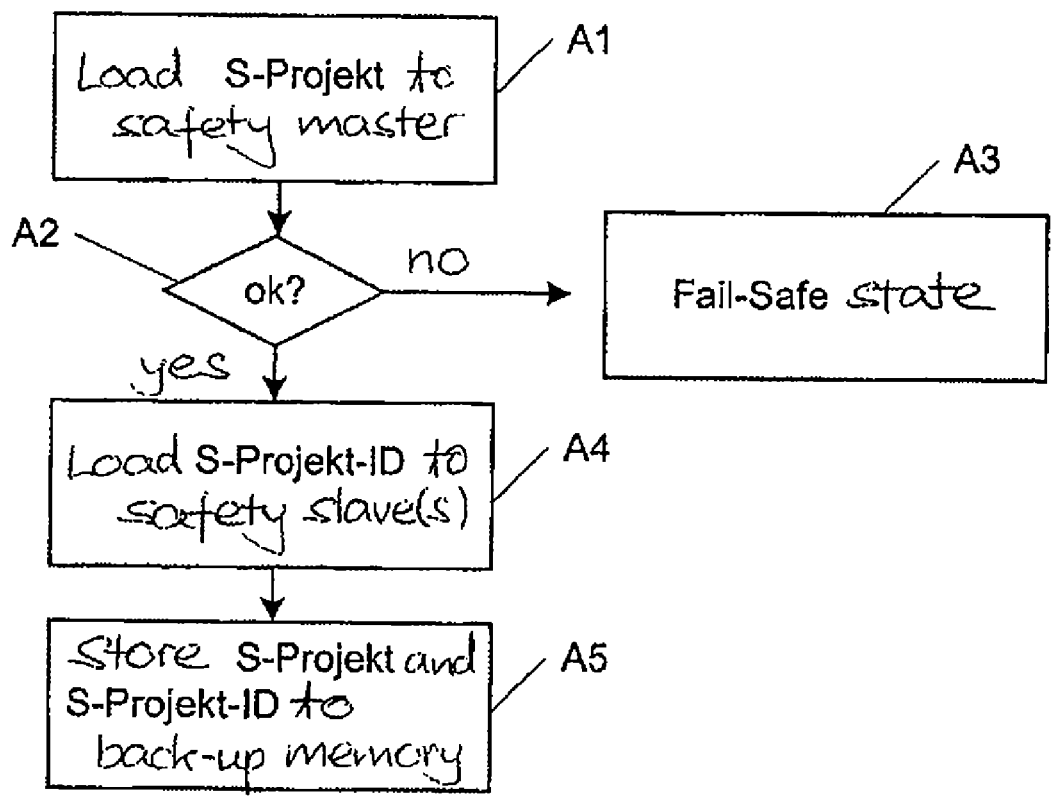

METHOD FOR OPERATING A SAFETY CONTROL AND AUTOMATION NETWORK HAVING SUCH A SAFETY CONTROL

CROSS-REFERENCE TO RELATED APPLICATIONS

This application is a continuation of International Patent Application No. PCT/EP2009/052673, filed on Mar. 6, 2009, which claims priority to German Application No. 10 2008 019 195.7, filed on Apr. 17, 2008, the entire contents of both of which are incorporated herein by reference.

BACKGROUND

The present invention relates to a method for operating a safety control on an automation network comprising a master subscriber implementing the safety control as well as to an automation network comprising a master subscriber implementing a safety control.

Modern concepts of industrial automation, e.g. controlling and monitoring technical processes by means of software, are based on the idea of a central control comprising a distributed sensor/actuator layer. Thereby, the subscribers communicate with one another and with superordinate systems via industrial local networks, in the following also referred to as automation networks. The control function is based on two basic ideas, i.e. geographically distributing and hierarchically subdividing the control functions. In this context, the functional hierarchy essentially divides up the automation task into a control layer and a sensor/actuator layer. The industrial local networks are usually configured as what is known as master-slave communication networks in which the master subscriber represents the control layer and the slave subscribers represent the sensor/actuator layer.

Safety is an essential demand in industrial automation. When carrying out automation tasks, it has to be safeguarded that the master-slave communication network, upon failure or if other errors occur, will not pose any danger to humans and the environment. For this reason, automation networks usually operate according to what is known as the fail-safe principle according to which the automation network is transferred into a safe state upon failure of a safety-relevant subscriber.

Within the framework of industrial automation, it is a safety-related issue if a safety-relevant subscriber is exchanged or newly implemented in the automation network to provide measures which reliably avoid errors during these procedures. When exchanging and/or newly implementing a safety-relevant subscriber in the automation system, it is usually necessary to load the facility-specific safe configuration of the subscriber, in the following also referred to as the safety control, into the exchanged and/or newly implemented safety-relevant subscriber.

The facility-specific safe configuration is usually stored as a back-up on a further subscriber in the industrial local network. In general, service personnel are able to download the safety control from a back-up memory to the safety-relevant subscriber only if they have a special authorization. Instead of downloading via the automation network, it is also possible to directly connect the back-up memory to the safety-relevant subscriber in order to transfer the facility-specific safe configuration. Basically, however, the installation of the safety control always holds the danger that a member of the service personnel inadvertently downloads the wrong configuration. For this reason, a lot of organizational time and effort is necessary in order to ensure sufficient safety during the exchange and/or the new installation of the safety-relevant subscriber.

In order to guarantee a reliable loading of the safety control to the safety-relevant subscriber in an automatic manner instead of calling upon service personnel, back-up systems are used in which the facility-specific safety-relevant configuration is stored in a stationary back-up memory which is e.g. arranged in the connecting plug of the safety-relevant subscriber. It is then possible to automatically upload the facility-specific safe configuration to the safety-relevant subscriber as long as the stationary back-up memory is intact and has e.g. not been damaged during the failure of the safety-relevant subscriber. In such automatic back-up systems, however, a high amount of hardware is involved since each of the safety-relevant subscribers requires a self-contained stationary back-up memory associated with it.

The problem of incorrectly downloading a facility-specific safe configuration to a safety-relevant subscriber in the automation network during the exchange of the safety-relevant subscriber as well as during the first implementation particularly occurs if a plurality of automation networks are coupled to one another, whereby varying safety controls operate on the individual industrial local network and thus, differing facility-specific safe configurations have to be downloaded to the safety-relevant subscribers of the individual industrial local networks. In this context, it is necessary that a reliable allocation of the different safety controls to the individual industrial local networks is carried out.

SUMMARY

The present invention provides a method for operating a safety control as well as an automation network, which automatically allow for reliably implementing and safely exchanging safety-relevant subscribers.

According to an embodiment of the invention, a method for operates a safety control in an automation network by means of a master subscriber implementing the safety control. An identifier being assigned to the safety control. The master subscriber verifies during loading of the safety control whether the identifier assigned to the safety control corresponds to the identifier calculated in the safety control. The automation network changes to a safe state if it is determined that the identifier differs.

According to an embodiment of the invention, an automation network comprises a master subscriber implementing a safety control. The master subscriber checks during the download of the safety control if an identifier assigned to the safety control corresponds to the identifier calculated in the safety control. The automation network changes to a safe state if it is determined that the identifiers differ.

BRIEF DESCRIPTION OF THE DRAWINGS

FIGS. 3A to C illustrate a flow chart for starting-up an automation network.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In industrial automation, automation networks are used in which distributed devices of an actuator/sensor layer, such as I/O modules, data loggers, drives, valves etc., communicate with automation computers of a control layer via an efficient real-time communication system. The subscribers in the automation network may be connected to one another via point-to-point connections or via a bus system. According to one embodiment, for a bus system, a field bus system is preferably used. The automation network is usually configured hierarchically and operates according to the master-slave principle. The master subscribers are assigned to the control layer and represent the active subscribers having an authorization to access the communication connections in the automation network and determine the data transfer. The slave subscribers are attributed to the sensor/actuator layer and represent the passive subscribers. They do not have an independent authorization to access the communication connections, i.e. they may only acknowledge the received data and, upon request of a master subscriber, transmit data to said master subscriber.

Figure 1:
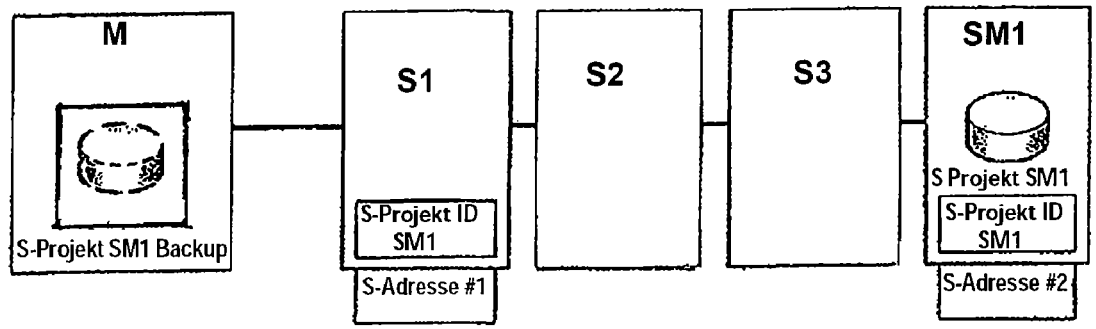
FIG. 1 schematically depicts an automation network comprising a safety area on which a safety control is operated.

FIG. 1 schematically depicts the basic structure of an automation network. The automation network comprises two master subscribers M, SM1 forming the control layer, and three slave subscribers S1, S2, S3 representing the actuator/sensor layer. All subscribers in the automation network are connected to one another via a serial bus via which a data exchange between the subscribers takes place. The data exchange between the subscribers is usually organized by the master subscribers in the form of data packets consisting of control data and user data, the control data in the data packet comprising an address information. Thereby, the data exchange may e.g. take place on the basis of the Ethernet protocol which allows for data packets having a lengths of up to 1,500 bytes at a continuously high transmission rate of 100 Mbit/sec.

It is an essential demand to the automation network to ensure that a failure of a subscriber and/or of the entire automation network does not constitute any danger to humans and the environment. For this reason, apart from the normal control functions a safety control has to be implemented on the control layer of the automation network which in the case of the safety-relevant subscribers in the automation network failing guarantees that the automation network automatically changes into a safe state according to what is known as the fail-safe principle. Such a safe state is e.g. an emergency switch of the automation network.

As generally not all subscribers in the automation network are safety-relevant and the number of safety functions in an automation network is usually lower than the number of non-safety-relevant control functions, a safety area is generally determined within the automation network. In the automation network shown in FIG. 1, the safety area is formed by the one safety-relevant master subscriber SM1, which in the following will also be referred to as safety-master subscriber SM1, and by a safety-relevant subscriber S1, which in the following will also be referred to as safety-slave subscriber S1.

Within the safety master SM1, a safety control S-Projekt-SM1, e.g. a facility-specific safe configuration is stored in a local memory. This facility-specific safe configuration determines the communication connection between the safety-master subscriber SM1 and the safety-slave subscriber S1. In order to unambiguously identify this safety connection, the safety-master subscriber SM1 and the safety-slave subscribe S1 each possess a unique safety address S-Adresse#1, S-Adresse#2 via which the safety subscribers address each other. The data exchange between the safety subscribers is carried out on the basis of a particular safety protocol which ensure a correct data exchange between the safety subscribers within the framework of the safety control.

The non-safety-relevant slave subscribers S2, S3 further present in the automation network depicted in FIG. 1 are controlled by the second master subscriber M, also referred to as standard-master subscriber M in the following. The standard-master subscriber M additionally serves as a configuration subscriber for the safety control in the automation network. In its function as a configuration subscriber, the standard-master subscriber M comprises a back-up system having a back-up memory in which the safety control S-Projekt-SM1 is stored. The back-up system of the standard-master subscriber M moreover comprises a safe programming tool guaranteeing a safe data transmission between the back-up memory and the safety-master subscriber SM1.

As an alternative to the embodiment shown in FIG. 1, the configuration subscriber, however, may also be another non-safety-relevant subscriber in the automation network. Moreover, a subscriber connected via a further network may also be used as the configuration subscriber, e.g. a subscriber from the data management layer superordinate to the automation network. Instead of separating the safety functions from the non-safety-relevant control functions by providing a separate master subscriber, as shown in FIG. 1, i.e. instead of using a safety-master subscriber for the safety functions and a standard-master subscriber for the non-safety-relevant control functions, it is also possible to carry out the safety-relevant control functions as well as the non-safety-relevant control functions on an individual master subscriber; however, it then has to be guaranteed that the non-safety-relevant control functions do not affect the safety-relevant control functions.

In order to allow for a fully automated integration of safety-relevant subscribers within the framework of a subscriber exchange or of a first implementation in the automation network shown in FIG. 1, an identifier S-Projekt-ID-SM1 is assigned to the safety control S-Projekt-SM1, i.e. to the facility-specific safe configuration. This identifier S-Projekt-ID-SM1 may be a check sum of the safety control program. It is, however, also possible to use a different identifier which may be determined in the safety control by means of a calculation procedure. The identifier S-Projekt-ID-SM1 of the safety control S-Projekt-SM1 is stored in all safety-relevant subscribers and guarantees that a subscriber exchange and/or a new implementation may be executed safely and reliably.

A first implementation of a safety control on a safety-master subscriber, e.g. after exchanging the safety-master subscriber or within the framework of an update of the safety control, is carried out by means of a configuration subscriber having such a safe programming tool. The safe programming tool loads the safety control into the safety-master subscriber together with an identifier assigned to the safety control. The safety-master subscriber checks whether the transmitted identifier corresponds to an identifier calculated in the safety control. If the safety-master subscriber thereby determines a deviation between the identifiers, the automation system changes to a safe state according to the fail-safe principle. In the case of a correlation between the identifiers, the safety-master subscriber stores the safety control and its associated identifier in a local memory provided in the safety-master subscriber.

If the safety control is to be initialized not only on the safety-master subscriber but in the entire automation network within the framework of a first implementation, the configuration subscriber furthermore downloads the identifier assigned to the safety control to safety-slave subscribers to be monitored within the framework of the safety control after successfully transmitting the safety control and the assigned identifier to the safety-master subscriber by means of its safe programming tool. Alternatively, the identifier assigned to the safety control may also be stored in the safety-slave subscribers by means of the safety-master subscriber. Moreover, upon finalizing initialization, the configuration subscriber stores the safety control and the associated identifier in a back-up memory.

During regular operation, the safety-master subscriber loads the safety control stored in its local memory together with the identifier associated to the safety control during start-up and checks whether the stored identifier corresponds to the identifier calculated in the safety control. If the safety-master subscriber thereby determines that the identifiers differ, the automation system changes to a safe state according to the fail-safe principle.

After terminating the start-up of the safety-master subscriber if the automation network has not changed over to a safe state, the safety-master subscriber checks whether in the safety-slave subscribers to be monitored within the framework of the safety control the identifier associated with the safety control is stored. If no identifier is stored in the safety-slave subscribers, e.g. because the safety-slave subscribers have been exchanged, the safety-master subscriber loads the identifier associated with the safety control to the safety-slave subscribers. If an identifier is stored in the safety-slave subscribers, the safety-master subscriber compares the identifier associated with the safety control to the identifier stored in the safety-slave subscribers, respectively. If a deviation between the identifiers is determined, the automation network changes to a safe state according to the fail-safe principle.

Figure 3B:
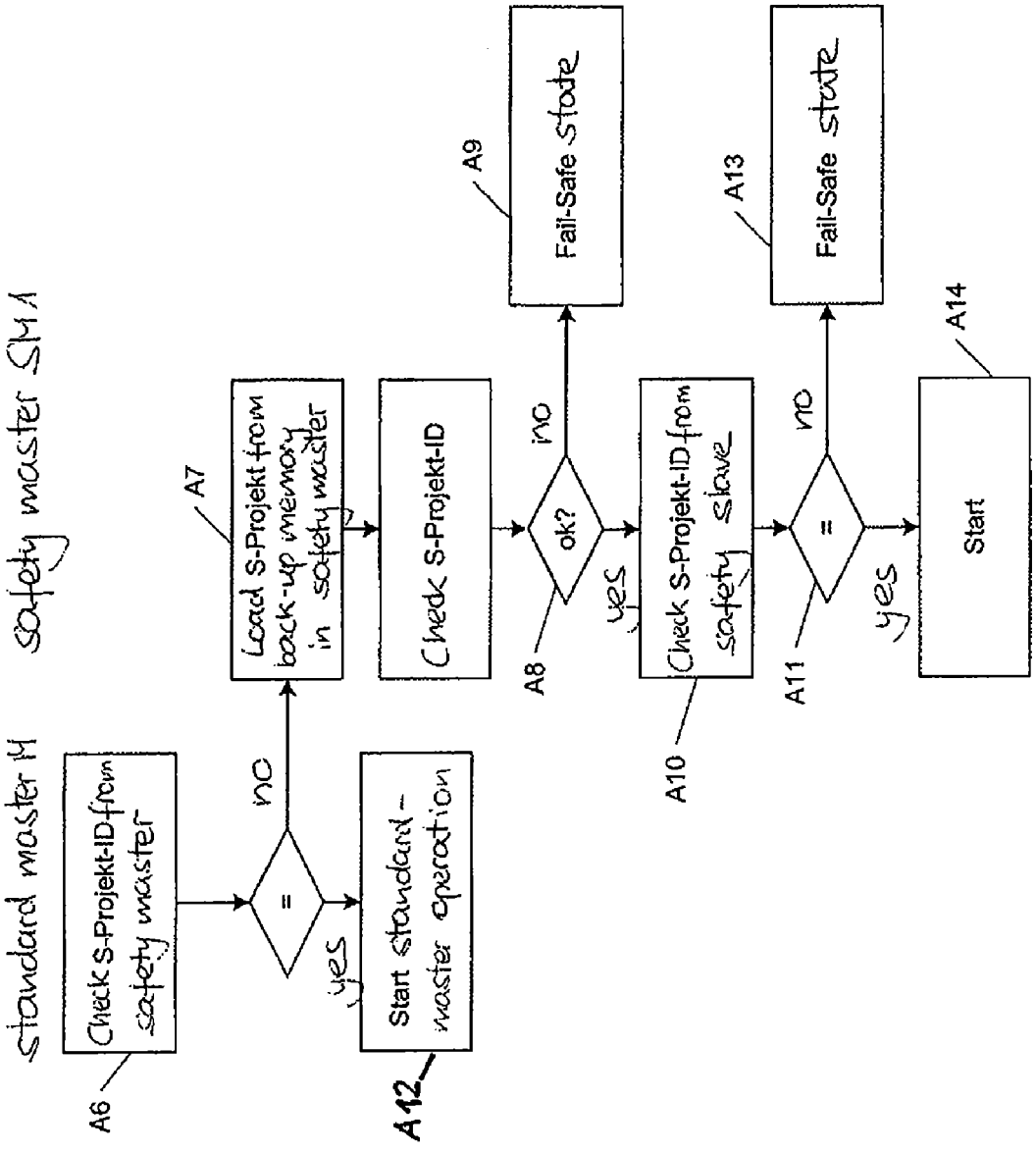
Figure 3C:
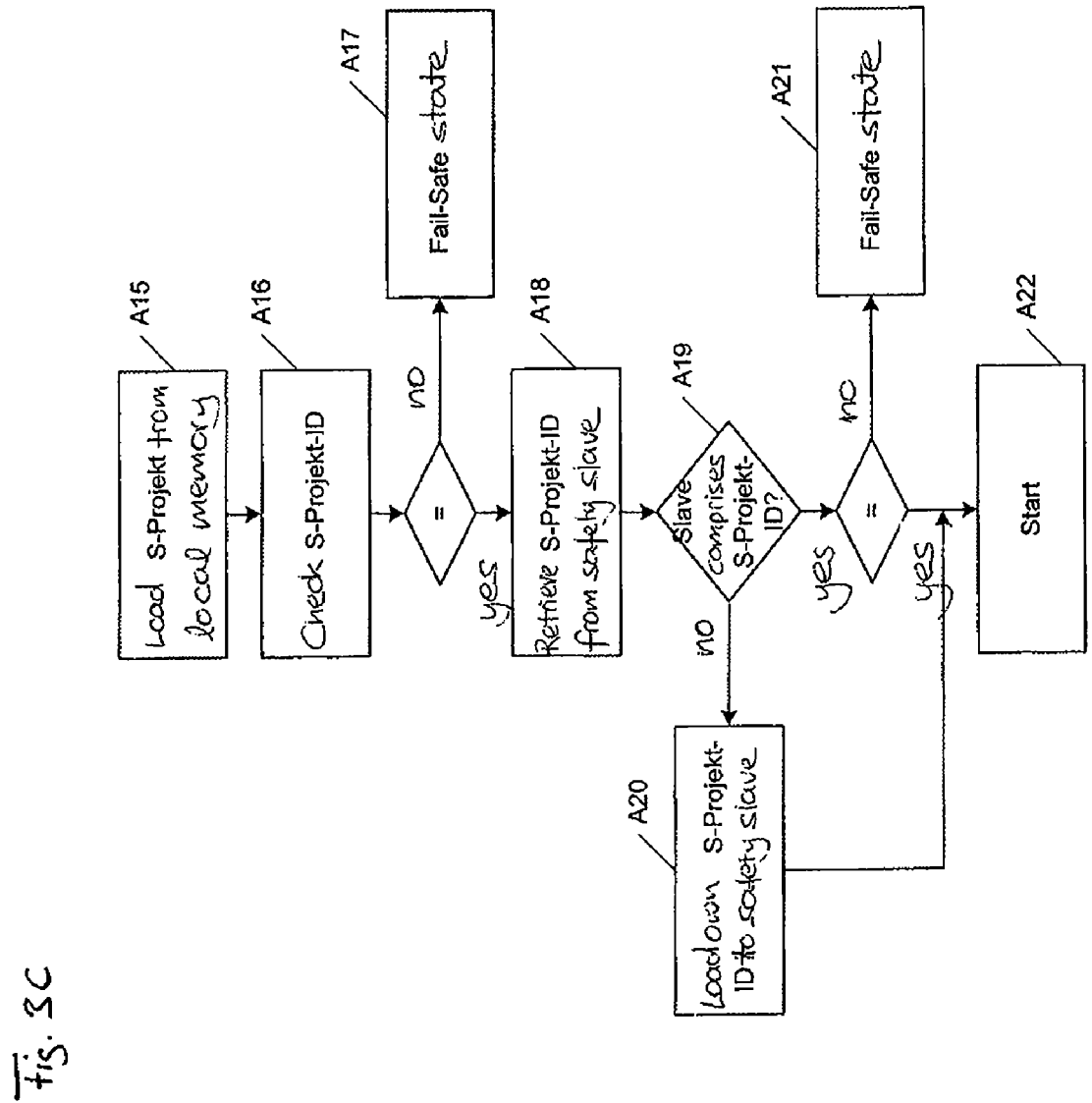

With regard to the automation network depicted in FIG. 1, the following applications may be considered, the schedules of which are depicted in FIGS. 3A, 3B and 3C.

Case 1 (FIG. 3A):

The safety control S-Projekt-SM1 is newly imported into the automation network. The facility-specific safe configuration is stored in the standard-master subscriber M. The safety-master subscriber SM1 as well as the safety-slave subscriber S1 is not configured. In step A1, the standard-master subscriber M downloads the safety control S-Projekt-SM1 together with the identifier S-Projekt-ID-SM1 associated with the safety control to the safety-master subscriber SM1 by means of its safe programming tool. In step A2, the safety-master subscriber SM1 checks if the transmitted identifier S-Projekt-ID-SM1 corresponds to an identifier calculated in the safety control S-Projekt-SM1. If the safety-master subscriber SM1 thereby determines a deviation between the identifiers, the automation system changes to a safe state according to the fail-safe principle in step A3.

In case of a correlation, the safety-master subscriber SM1 in step A4 stores the identifier S-Projekt-ID-SM1 associated with the safety control in the safety-slave subscribers S1 to be monitored according to the safety control. The storing of the identifier S-Projekt-ID-SM1 associated with the safety control to the safety-slave subscribers S1 to be monitored may also be carried out by the standard-master subscriber M. The safety control S-Projekt-SM1 in the automation network is then ready for operation. Moreover, the standard-master subscriber M stores the safety control S-Projekt-SM1 and the associated identifier S-Projekt-ID-SM1 in its back-up memory.

Case 2 (FIG. 3B):

There is no safety control present within the safety-master subscriber SM1, as the safety-master subscriber SM1 was e.g. exchanged, or the safety-master subscriber SM1 contains a different safety control than the one expected because e.g. an update has not yet been installed. In step A6, the standard-master subscriber M checks upon starting up the automation network whether the identifier assigned to safety control S-Projekt-SM1 is present in the safety-master subscriber SM1. In the case of a correlation, the standard-master subscriber M changes to normal operation in step A 12.

If the standard-master subscriber M determines that the safety-master subscriber SM1 does not have a valid configuration, the standard-master subscriber M thereupon, in a step A7, loads the safety control S-Projekt-SM1 together with the identifier S-Projekt-ID-SM1 assigned to the safety control from its back-up memory to the safety-master subscriber SM1.

In step A8, the safety-master subscriber SM1 checks whether the uploaded identifier S-Projekt-ID-SM1 corresponds to the identifier calculated in the safety control S-Projekt-SM1. If the identifiers differ, the automation network changes to a safe state in step A9.

In the case of a correlation, the safety-master subscriber SM1 retrieves the identifier from the safety-slave subscriber S1 during the start-up of the communication connection to the safety-slave subscriber S1 in step A10. In step A11, the safety-master subscriber SM1 compares the identifier with the identifier S-Projekt-ID-SM1 assigned to the safety control. If a discrepancy is determined between the identifiers, the automation network changes to a safe state in step A13. Otherwise, normal operation resumes in step A14.

Case 3 (FIG. 3C):

In normal operation during the start-up of the automation network, the safety-master subscriber SM1 determines the identifier of the uploaded safety control after uploading the safety control S-Projekt-SM1 in step A15. In step A16, the safety-master subscriber SM1 compares the calculated identifier with the identifier S-Projekt-ID-SM1 assigned to the safety control. If the safety-master subscriber SM1 determines a deviation between the identifiers, the automation network changes to a safe state according to the fail-safe principle in step A17.

In the case of a correlation of the identifiers after conclusion of the start-up process of the safety-master subscriber SM1, the safety-master subscriber SM1 in step A18 retrieves from the safety-slave subscriber S1 to be monitored within the framework of the safety control the identifier stored therein. If the safety-master subscriber SM1 determines in step A19 that no identifier is stored in the safety-slave subscriber S1, the safety-master subscriber in step A20 uploads the identifier S-Projekt-ID-SM1 assigned to the safety-slave subscriber S1 to the safety-slave subscriber S1 and in step A22 changes to normal operation. If an identifier is stored in the safety-slave subscriber S1, the safety-master subscriber SM1 compares the identifier S-Projekt-ID-SM1 assigned to the safety control with the identifier stored in the safety-slave subscriber. When determining a deviation between the identifiers, the automation network changes to a safe state in step A21. Otherwise, normal operation is resumed in step A22.

Figure 2:
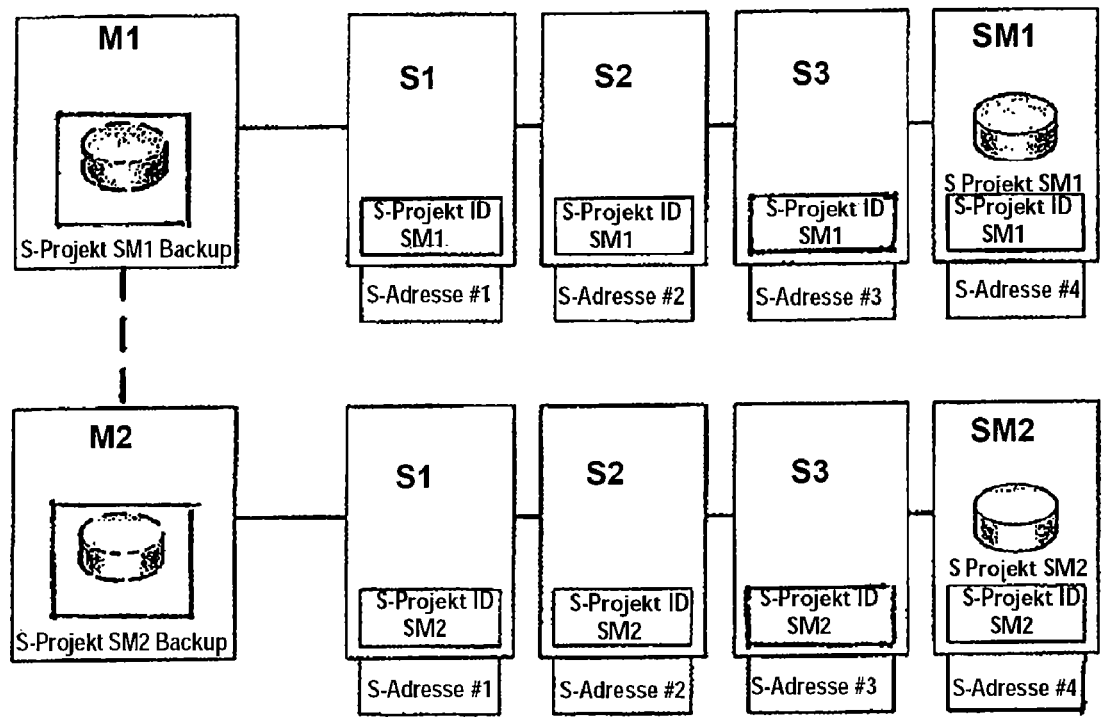
FIG. 2 shows two automation networks coupled to each other, each comprising a safety area which is respectively operated by a self-contained safety control.

By means of the inventive allocation of an identifier to the safety control, it is also possible apart from the fully automatic implementation of safety-relevant subscribers to guarantee an unambiguous allocation of the safety-relevant subscribers across the entire facility. FIG. 2 depicts an embodiment in which two automation networks assigned to different facility parts and implementing separate safety controls S-Projekt-SM1, S-Projekt-SM2 are networked with each other. Thereby, both automation networks each comprise a safety-master subscriber SM1, SM2 to which three safety-slave subscribers S1, S2, S3 are respectively assigned within the framework of a safety control to be executed. In this context, the subscriber connections of the safety controls in the individual automation networks are determined by means of safety addresses S-Adresse #1, S-Adresse #2, S-Adresse #3, S-Adresse #4. Furthermore, both automation networks each comprise a standard-master subscriber M1, M2, which simultaneously serves as a configuration subscriber for the safety controls S-Projekt-SM1, S-Projekt-SM2 of the individual automation networks and comprises a back-up system for this purpose.

As the two automation networks execute differing safety controls S-Projekt-SM1, S-Projekt-SM2, the unique identifiers S-Projekt-ID-SM1, S-Projekt-ID-SM2 assigned to the respective safety controls provides an unambiguous allocation of the master-slave subscribers to the individual safety controls across the entire facility. In this manner, it may be avoided that due to the interlinking of the two automation networks the safety-master subscriber of one automation network inadvertently addresses a safety-slave subscriber in the other automation network due to similar safety addresses.

According to the invention, in order to operate a safety control in an automation network having a master subscriber implementing the safety control, the safety control is assigned an identifier. When loading the safety control, the master subscriber checks whether the identifier assigned to the safety control corresponds to the identifier calculated in the safety control. If a deviation is determined, the automation network changes to a safe state.

By safeguarding the safety control by means of an identifier and by checking in the master subscriber of the automation network during start-up whether the identifier calculated in the safety control corresponds to the identifier assigned to the safety control, an implementation of the automation network comprising safety-relevant subscribers may be carried out in a fully automated and simple manner, in particular an implementation of the safety-relevant master subscriber. By means of the additional identifier of the safety control, it is furthermore possible to carry out an unambiguous identification within the framework of an automatic check. Thereby, errors during implementation are reliably avoided since it is ensured that no faulty safety control is loaded into the master subscriber. This is particularly true if the safety-relevant master subscriber is networked with further safety-relevant master subscribers on which a different safety program operates, since the identifier assigned to the respective safety control allows for unambiguous allocation to the individual automation network.

According to an embodiment, it is checked by means of a configuration subscriber during the start-up of the automation network, whether the safety control is stored in the master subscriber, and, if the safety control is not stored in the master subscriber, the safety control is loaded into the master subscriber together with the identifier associated to the safety control.

This approach allows for a safe and reliable automatic implementation and/or for a safe and reliable automatic update of the safety control by means of the configuration subscriber on the control layer of the automation network.

According to an embodiment, it is moreover checked by the master subscriber during the start-up of the automation network whether an identifier assigned to a safety control is stored in a slave subscriber of the automation network to be monitored within the framework of the safety control. If no identifier is stored in the slave subscriber, the identifier assigned to the safety control in the master subscriber is loaded to the slave subscriber. If an identifier is stored in the slave subscriber, the master subscriber compares the identifier assigned to the safety control in the master subscriber to the identifier stored in the slave subscriber. The automation network changes to a safe state if it is determined that the identifiers differ.

This approach provides that an automatic implementation of safety-relevant devices on the actuator/sensor layer of the automation network may be carried out reliably and safely. The control layer in form of the master subscriber compares the identifier assigned to the safety control, which is stored in the master subscriber, to identifiers stored in the safety-relevant slave subscribers prior to putting the slave subscriber into operation. By means of this approach, devices on the actuator/sensor layer of automation networks may be implemented in a safe and reliable manner.

The invention claimed is:

1. A method for operating a safety control in an automation network by means of a master subscriber implementing the safety control,
an identifier being assigned to the safety control and the master subscriber verifying during loading of the safety control whether the identifier assigned to the safety control corresponds to an identifier calculated in the safety control and the automation network changing to a safe state if it is determined that the identifier differs, wherein during a start-up of the automation network the master subscriber checks whether an identifier assigned to a safety control is stored in a slave subscriber of the automation network to be monitored within the framework of the safety control,
wherein, if no identifier is stored in the slave subscriber, the identifier assigned to the safety control in the master subscriber is loaded to the slave subscriber, and
wherein, if an identifier is stored in the slave subscriber, the master subscriber compares the identifier assigned to the safety control in the master subscriber to the identifier stored in the slave subscriber and the automation network changes to a safe state if it is determined that the identifiers differ.

2. The method according to claim 1, the identifier calculated in the safety control being a check sum of the safety control.

3. The method according to claim 1,
wherein during the start-up of the automation network whether the safety control is stored in the master subscriber is checked, and
wherein, if the safety control is not stored in the master subscriber, the safety control is downloaded to the master subscriber together with the identifier assigned to the safety control.

4. An automation network comprising a master subscriber implementing a safety control, the master subscriber checking during a download of the safety control if an identifier assigned to the safety control corresponds to an identifier calculated in the safety control, the automation network changing to a safe state if it is determined that the identifiers differ, the master subscriber checking during a start-up of the automation network whether an identifier assigned to the safety control is stored in a slave subscriber of the automation network to be monitored within the framework of the safety control, and if no identifier is stored in the slave subscriber, loading the identifier assigned to the safety control in the master subscriber to the slave subscriber, and, if an identifier is stored in the slave subscriber, adjusting the identifier assigned to the safety control in the master subscriber to the identifier stored in the slave subscriber, the automation network changing to a safe state if it is determined that the identifiers differ.

5. The automation network according to claim 4, the identifier calculated in the safety control being a check sum of the safety control.

6. The automation network according to claim 4, a configuration subscriber being provided which checks during the start-up of the automation network whether the safety control is stored in the master subscriber, and, if the safety control is not stored in the master subscriber, loads the safety control to the master subscriber together with the identifier assigned to the safety control.

7. A method for operating a safety control in an automation network by means of a master subscriber implementing the safety control and at least one safety-relevant slave subscriber,
the safety control providing a facility-specific safe configuration of the master subscriber and of the slave subscriber and determining a safety connection between the master subscriber and the slave subscriber,
an identifier being assigned to the safety control,
wherein when putting into operation the automation network, the master subscriber checks upon loading the safety control whether the identifier assigned to the safety control corresponds to an identifier calculated in the safety control,
wherein the automation network changes to a safe state if a deviation between the identifiers is determined, and
wherein in the case of a correlation of the identifiers the master subscriber further checks whether an identifier associated to a safety control is stored in the slave subscriber,
wherein, if no identifier is stored in the slave subscriber, the master subscriber loads the identifier associated with the safety control to the slave subscriber, and wherein, if an identifier is stored in the slave subscriber, the master subscriber compares the identifier associated to the safety control to the identifier stored in the slave subscriber, wherein the automation network changes to a safe state if a deviation between the identifiers is determined.

8. The method of claim 7, wherein it is checked when putting into operation the automation network whether a safety control is stored in the master subscriber, wherein, if no safety control is stored in the master subscriber, the safety control is downloaded to the master subscriber together with the identifier assigned to the safety control, and the master subscriber checks whether the identifier associated with the safety control corresponds to an identifier calculated in the safety control, wherein the automation network changes to a safe state if a deviation between the identifiers is determined.

9. The method according to claim 7, wherein the identifier calculated in the safety control is a check sum of the safety control.

10. The method according to claim 7, wherein the master subscriber and the slave subscriber each comprise a unique safety address by means of which the subscribers address one another, wherein a data exchange between the subscribers is carried out on the basis of a safety protocol.

11. An automation network comprising a master subscriber implementing a safety control and at least one safety-relevant slave subscriber,
the safety control providing a facility-specific safe configuration of the master subscriber and of the slave subscriber and determining a safety connection between the master subscriber and the slave subscriber,
an identifier being assigned to the safety control,
the master subscriber being configured, when putting into operation the automation network, to check upon loading the safety control whether the identifier assigned to the safety control corresponds to an identifier calculated in the safety control, wherein the automation network changes to a safe state if a deviation between the identifiers is determined, and
the master subscriber being configured to check, in the case of a correlation of the identifiers, whether an identifier associated to a safety control is stored in the slave subscriber, if no identifier is stored in the slave subscriber, to load the identifier associated with the safety control to the slave subscriber, and, if an identifier is stored in the slave subscriber, to compare the identifier associated to the safety control to the identifier stored in the slave subscriber, wherein the automation network changes to a safe state if a deviation between the identifiers is determined.

12. The automation network according to claim 11, comprising an configuration subscriber configured to check when putting into operation the automation network whether a safety control is stored in the master subscriber, and, if no safety control is stored in the master subscriber, to download the safety control to the master subscriber together with the identifier assigned to the safety control, the master subscriber being configured to check whether the identifier associated with the safety control corresponds to an identifier calculated in the safety control, wherein the automation network changes to a safe state if a deviation between the identifiers is determined.

13. The automation network according to claim 12, wherein the configuration subscriber comprises a back-up system having a back-up memory in which the safety control is stored and having a safe programming tool.

14. The automation network according to claim 12, comprising a further master subscriber for controlling non-safety-relevant slave subscribers, the further master subscriber having the function of the configuration subscriber.

15. The automation network according to claim 11, comprising a further master subscriber implementing a further safety control as well as at least one safety-relevant slave subscriber assigned to the further master subscriber implementing a further safety control, wherein unique identifiers are each assigned to the safety control and to the further safety control.

* * * * *